United States Patent [19]

Young

[11] 4,185,654
[45] Jan. 29, 1980

[54] ANTI-SIPHONING DEVICE FOR VENTING DRAIN LINES

[76] Inventor: Lyle M. Young, 1807 W. Minnehaha, St. Paul, Minn. 55104

[21] Appl. No.: 948,385

[22] Filed: Oct. 4, 1978

[51] Int. Cl.² .............................................. F16K 24/00
[52] U.S. Cl. .................................. 137/218; 137/216.2
[58] Field of Search .............................. 137/216.2, 218

[56] References Cited

U.S. PATENT DOCUMENTS

| 2,850,034 | 9/1958 | Svabek et al. | 137/218 |
| 3,107,682 | 10/1963 | Young | 137/218 |
| 3,470,898 | 10/1969 | Langdon | 137/218 |

FOREIGN PATENT DOCUMENTS 1609244  3/1970  Fed. Rep. of Germany .......... 137/218

*Primary Examiner*—Gerald A. Michalsky
*Attorney, Agent, or Firm*—Peterson, Palmatier, Sturm & Sjoquist, Ltd.

[57] ABSTRACT

The anti-siphoning device includes a T-shaped valve body having a downwardly facing opening, an upwardly facing opening and a laterally facing opening. Constrained for vertical movement within the valve body is a hollow cylindrical float valve having a closed lower end for normally closing the lower opening of the valve body, an open upper end so that air can pass downwardly through the upwardly facing opening of the valve body into the interior of the cylindrical float valve, out through the circumferentially spaced holes and then through the laterally facing opening of the valve body. The downwardly facing opening of the valve body is connected to the outlet of the sink or basin to be drained. Waste water entering the valve body via the downwardly facing opening buoys the float valve upwardly, the water passing outwardly through the laterally facing opening along with the air entering the upwardly facing opening of the valve body. When no waste water is flowing, then the weight of the float valve seals against an annular seat innerjacent the downwardly facing opening of the valve body so that sewer gases will not flow upwardly past the float valve. Also, an air valve is located in the upper portion of the valve body, the air valve normally preventing air from entering the valve body but permitting air to enter when a reduced pressure exists within the valve body due to the flow of waste water upwardly through the downwardly facing opening and outwardly through the laterally facing opening.

5 Claims, 3 Drawing Figures

ANTI-SIPHONING DEVICE FOR VENTING DRAIN LINES

BACKGROUND OF THE INVENTION

1. Field of the Invention

This invention relates generally to venting systems for drain lines, and pertains more particularly to an improved anti-siphoning device therefor.

2. Description of the Prior Art

In household plumbing, a roof vent or stack pipe is normally required to prevent sewer gases from flowing upwardly through the drain line into the dwelling via the sink or basin. Stack pipes have posed a serious problem, particularly where modern-day households make use of a number of lavatories, because each sink or other item to be drained requires a stack pipe, or if a single vertical stack or venting pipe is employed, then lateral runs must be employed in order to connect the various appliances to be drained to the centrally located stack pipe. Even the incorporation of a single stack or vent pipe can be quite costly, and when additional stack pipes must be employed, or lateral connections made to a centrally located stack pipe, the installation costs become quite significant.

The problem has been recognized for a number of years. In this regard, my previously issued U.S. Pat. No. 3,107,682, granted on Oct. 22, 1963 for "Ventilating System" effectively eliminates the need for a stack pipe. While my patented invention has performed admirably, nonetheless I have now devised an improved anti-siphoning device, the present device possessing various improved features over my previous system.

SUMMARY OF THE INVENTION

Generally, my invention has for an object the elimination of the customary stack pipe or roof vent, and at the same time avoid any siphoning of water contained in the usual trap that provides a sealing action against the reverse flow of sewer gases.

Another object is to provide an anti-siphoning device that will be simple, rugged and not apt to malfunction, even when employed over many, many years.

A further object of the invention is to provide an anti-siphoning device employing a float valve therein which need not be oriented in any particular direction, the float valve when practicing the teachings of my invention performing in any angular position in which it resides within the valve body.

Yet another object of the invention is to provide an anti-siphoning device of the foregoing character which permits a greater flow of air when waste water is flowing than possible with my patented ventillating system.

Still another object of the invention is to provide an anti-siphoning device that will be inexpensive to manufacture, thereby encouraging its widespread use, especially when it is employed in lieu of a stack or roof vent.

Briefly, my invention envisages a T-shaped valve body having a downwardly facing opening, an upwardly facing opening and a laterally facing opening. Contained within the valve body and vertically movable therein is a hollow cylindrical float valve having a closed bottom end which normally seals against an annular resilient seat. The float valve will rise, however, when there is an upward flow of waste water, the waste water passing out through the laterally facing opening. Concomitantly with the foregoing is the opening of a valve in the upper portion of the valve body which permits air to enter, the valve opening when a reduced pressure exists within the valve body. In this way, a venting action is automatically provided each time there is a flow of water through the valve body. The air flows down through the upwardly facing opening of the valve body, through the open upper end of the float valve and exits through various circumferentially spaced holes in the float valve so that the air passes out through the laterally facing opening with the flow of waste water. When the waste water stops flowing, the air valve immediately closes and seals against any entrance of air that might produce an anti-siphoning effect. Also, when the flow of waste water stops, the float valve gravitationally reseals against the annular seat so that sewer gases will not flow upwardly through the anti-siphoning device.

DESCRIPTION OF THE PREFERRED EMBODIMENT

Figure 1:
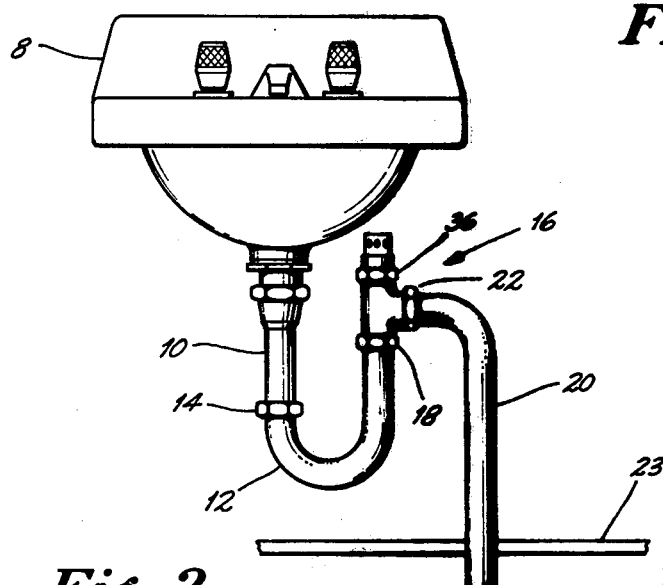
FIG. 1 is a front elevational view of a sink with my anti-siphoning device installed in conjunction therewith.

Although my invention will find utility in conjunction with various lavatory appliances that require draining, a conventional sink 8 has been pictured in FIG. 1. Extending downwardly from the outlet of the sink 8 is a tailpiece 10 to which one end of a U-shaped trap 12 is attached by means of a slip nut 14.

My anti-siphoning device has been indicated in its entirety by the reference numeral 16 and is attached to the other end of the U-shaped trap 12 by means of a slip nut 18. A drain line 20 is connected to my device 16 by means of a slip nut 22 and extends downwardly through the floor 23, connecting with the street-located sewer (not shown).

It will be recognized that the drain connection shown in FIG. 1 represents a so-called "S" connection. This has been selected for ease of illustration in that it can be shown in only one view. However, it will be appreciated that my invention is equally suited for "P" connections wherein the drain line extends into the wall and then downwardly to the sewer.

Figure 2:
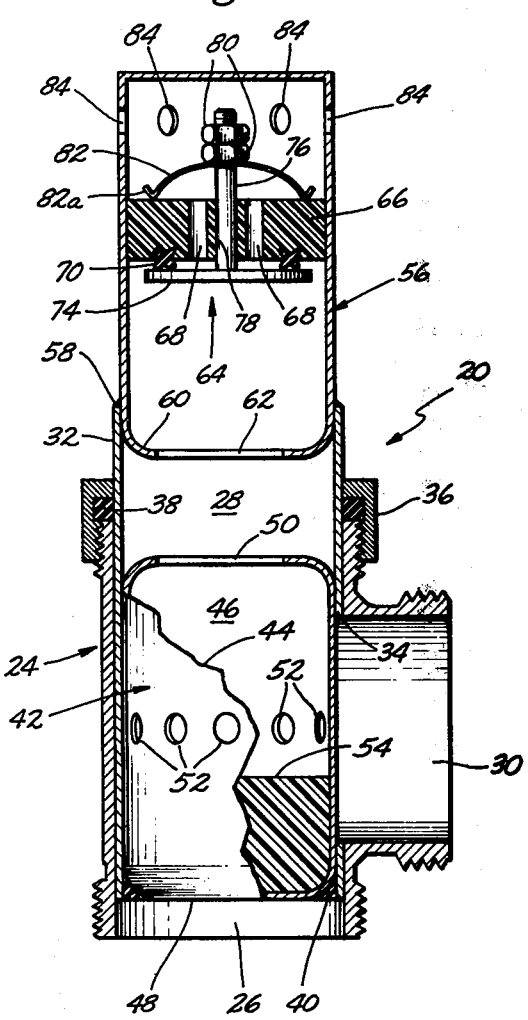
FIG. 2 is an enlarged sectional view of the device with the movable parts thereof depicted in the positions that they assume when no waste water is being drained from the sink of FIG. 1.
Figure 3:
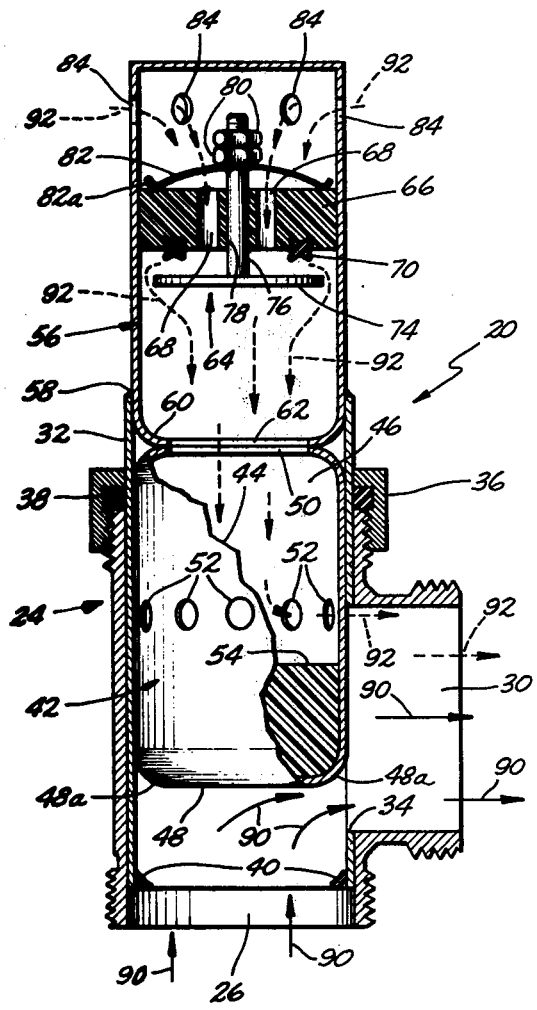
FIG. 3 is a view similar to FIG. 2 but with the parts depicted in positions they assume when waste water is being drained from the sink of FIG. 1.

Referring now in detail to FIGS. 2 and 3, it is to be observed that my anti-siphoning device 16 includes a T-shaped body 24 having a downwardly facing, externally threaded opening 26 to which the U-shaped trap 12 is connected by means of the nut 18, an upwardly facing, externally threaded opening 28, and a laterally facing, externally threaded opening 30 to which the drain line 20 is connected by means of the nut 22.

In the illustrative embodiment, a sheet metal, although it can be of plastic, cylindrical liner 32 is disposed within the T-shaped valve body 20. The liner 32 has an opening 34 that is in registry with the laterally facing opening 30 of the valve body 20. The cylindrical liner 32 is held in place by means of a slip nut 36 and O-ring 38, the slip nut 36 being threadedly connected to the external threads associated with the upwardly facing opening 28. The lower end of the liner 32 contains an annular resilient seat or sealing member 40 for a purpose presently to be explained.

At this time, attention is directed to a float valve 42 which includes a relatively thin plastic or sheet metal forming a cylindrical shell 44. The float valve 42 has a generally hollow interior 46. However, the float valve 42 is closed at its lower end 48, but has an opening 50 at its upper end. Intermediate the ends 48, 50 of the shell 44 is a plurality of circumferentially spaced holes 52. Within the lower portion of the float valve is a buoyant material 54, such as foamed polyurethane.

A cylindrical sleeve 56 has its lower end telescopically received within the upper end of the liner 32. The sleeve 56 is fixedly secured to the liner 32 by means of an appropriate adhesive at 58. It will be perceived that the lower end of the sleeves 56 is inturned so as to provide an inwardly directed flange 60 forming an opening 62.

Contained within the sleeve 56 is an air valve 64 comprising a disc 66 fixedly held within the sleeve 56, the disc 66 having a plurality of angularly spaced openings or passages 68 extending downwardly therethrough. A quad ring 70 is attached to the lower face of the disc 66 and coacts with a thin circular disc or valve member 74 having an upwardly extending shaft 76 at its center, the shaft 76 being vertically movable in a bore 78 centrally located in the stationary disc 66. A pair of hexogonal nuts 80 are threaded onto the upper end of the vertical shaft 76 and serve to hold a bowed leaf spring 82 in place, the opposite ends of the leaf spring being curved at 82a and bearing against the upper face of the fixed disc 66. In this way, the resiliency of the bowed leaf spring 82 normally urges or biases the disc 74 upwardly so as to cause the upper surface thereof to press against the quad ring 70 and in this way normally seal against any downward flow of air.

The upper end portion of the cylindrical sleeve 56 has a number of angularly spaced air inlet holes 84 formed therein. Of course, normally the disc 74, being biased upwardly by the leaf spring 82, prevents any air from entering through the holes 84 and flowing downwardly through the passages 68.

From FIG. 2, it is believed evident that when no water is being drained from the sink 8 (or other lavatory appliance), then the float valve 42 rests against the resilient annular seal 40 so that any sewer gases apt to flow reversely upwardly through the drain line 20 are effectively blocked by reason of the curved lower end, which has been labeled 48a, of the float valve 42 and the sealing thereof against the resilient annular seat 40. Hence, no sewer gases can pass through the trap 12 (even when no water is contained therein) and then upwardly through the tailpiece into the room through the sink 8.

Also, the normally closed air valve 64 within the sleeve 56 prevents any reverse flow of sewer gases through the circumferentially spaced holes 52, the opening 50 in the top of the float valve 42, upwardly into the upper sleeve 56 through the openings 84 into the room where the sink 8 is located. Stated somewhat differently, the bowed leaf spring 82, owing to it biasing the disc 74 upwardly, causes the disc 74 to seal against the quad ring 70 so that no gases can escape upwardly through the passages 68.

Turning now to FIG. 3, the solid line arrows 90 show the flow of waste liquid from the sink 8, the flow being upwardly through the downwardly facing opening 26 into the interior of the T-shaped valve body 24. The flow of waste water buoys the float valve 42 upwardly and the water is then free to exit via the laterally facing opening 30 which is connected to the drain line 20 leading to the sewer.

The flow of waste water, as denoted by the solid line arrow 90, creates a subatmospheric pressure condition or slight vacuum within the valve body 24 and this reduced pressure overcomes the biasing action of the leaf spring 82 so that the disc 74 moves downwardly away from the quad ring 70, thereby drawing in air through the holes 84 in the upper portion of the sleeve 56. It will be appreciated that the air is caused to traverse a downward path through the vertical passages 68 provided in the fixed disc 66 and thence between the lower face of the quad ring 70 and the upper face of the disc or valve member 74, the air then continuing downwardly past the periphery of the disc or valve member 74. The air is free to continue downwardly through the opening 62 in the sleeve 50 and through the opening 50 in the upper end of the shell 44 of the valve 42. Once having entered the float valve 42, it can pass outwardly through whatever circumferentially spaced holes 52 are facing the openings 30, 34. The air path that has just been described has been identified by the series of broken arrows 92.

At this time, specific attention is called to the inturned flange 60 which acts as a stop to prevent the float valve 42 from rising too high within the valve body 24, more specifically the liner 32. The inwardly turned flange 60, it will be appreciated, is located so that when the upper end of the float valve 42 abuts against this flange, the various circumferentially spaced holes 52 in the shell 44 will not be above the laterally facing opening 30 in the valve body 24, and also, of course, not above the opening 34 in the liner 32.

As soon as the flow of waste water from the sink 8 ceases, then the float valve 42 gravitationally reseals against the resilient annular seat 40. Since there is no longer any liquid flow, the reduced or subatmospheric pressure condition no longer exists and the bowed leaf spring 82 again raises the disc valve 74 so that it seats or bears against the under side of the quad ring 70. Consequently, no reverse flow of sewer gases upwardly through the drain line 20 can occur, either downwardly through the downwardly facing opening 26 in the valve body 24 which connects with the sink 8 through the trap 12 and tailpiece 10, or upwardly through the upwardly facing opening 28 therein because the air valve 64 is now closed. Consequently, the float valve 42 prevents any flow of sewer gases downwardly through the downwardly facing opening 26 and the air valve 64, more specifically the disc 74 thereof, prevents any upward flow of sewer gases through the angularly spaced holes 84 in the sleeve 56.

I claim:

1. An anti-siphoning device for draim lines comprising a T-shaped valve body having a downwardly facing opening, an upwardly facing opening and an intermediate laterally facing opening, a generally hollow cylindrical float valve constrained for vertical movement within said body having a closed lower end for normally closing said downwardly facing opening but permitting liquid to buoy said float valve upwardly to allow waste water to flow upwardly through said downwardly facing opening and outwardly through said laterally facing opening, said float valve having an open upper end and having circumferentially spaced holes intermediate its ends for enabling air to flow downwardly through said upwardly facing opening, through said circumferentially spaced holes, and outwardly through said laterally facing opening.

2. An anti-siphoning device in accordance with claim 1 including an annular seat for supporting said float valve when not buoyed upwardly by flowing waste water, the closed end of said float valve resting on said seat for normally closing said downwardly facing opening.

3. An anti-siphoning device in accordance with claim 2 including means in said valve body for preventing upward movement of said float valve to such an extent that said circumferentially spaced holes would be above said laterally facing opening.

4. An anti-siphoning device in accordance with claim 1 including an air valve for preventing the reverse flow of sewer gases through said laterally facing opening, said circumferentially spaced holes in said float valve and upwardly through said opening in the upper end of said float valve.

5. An anti-siphoning device in accordance with claim 4 in which said float valve includes a relatively thin cylindrical shell, said shell being rounded adjacent its lower end, and a resilient seat against which said rounded lower end of said shell bears to prevent reverse flow of sewer gases through said downwardly facing opening.

* * * * *